(12) United States Patent
Tamura

(10) Patent No.: US 9,629,205 B2
(45) Date of Patent: Apr. 18, 2017

(54) TEMPERATURE CONTROL DEVICE

(71) Applicant: Semiconductor Energy Laboratory Co., Ltd., Atsugi-shi, Kanagawa-ken (JP)

(72) Inventor: Hikaru Tamura, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 348 days.

(21) Appl. No.: 14/297,887

(22) Filed: Jun. 6, 2014

(65) Prior Publication Data

US 2014/0284324 A1 Sep. 25, 2014

Related U.S. Application Data

(63) Continuation of application No. 12/003,124, filed on Dec. 20, 2007, now Pat. No. 8,759,725.

(30) Foreign Application Priority Data

Dec. 22, 2006 (JP) ................................. 2006-345555

(51) Int. Cl.
*H05B 6/66* (2006.01)
*A47J 36/24* (2006.01)
(Continued)

(52) U.S. Cl.
CPC ............... *H05B 6/645* (2013.01); *H02J 7/00* (2013.01); *H02J 17/00* (2013.01); *H05B 6/6402* (2013.01); *H05B 6/66* (2013.01)

(58) Field of Classification Search
CPC .. H02J 7/00; H02J 17/00; H05B 6/645; H05B 6/6402; H05B 6/66
(Continued)

(56) References Cited

U.S. PATENT DOCUMENTS 3,931,494 A 1/1976 Fisher et al.
4,219,715 A 8/1980 Mandle et al.
(Continued)

FOREIGN PATENT DOCUMENTS

JP 06-147490 A 5/1994
JP 07-022172 A 1/1995
(Continued)

*Primary Examiner* — Quang Wan
(74) *Attorney, Agent, or Firm* — Robinson Intellectual Property Law Office; Eric J. Robinson

(57) ABSTRACT

A temperature control device which can control the temperature of an object to be processed even after supply of radio waves or electromagnetic waves from a high-frequency heating apparatus is stopped. The temperature control device includes a temperature sensor detecting the temperature of the object to be processed heated by radio waves generated from the high-frequency heating apparatus, a signal processing circuit comparing the temperature detected by the temperature sensor with a standard temperature, a rechargeable battery charged by electric energy generated by reception of the radio waves by an antenna, a charging circuit controlling charging of the rechargeable battery, and a heater supplied with electric power from the rechargeable battery to heat the object to be processed so that the temperature thereof gets closer to the standard temperature, in accordance with a comparison result by the signal processing circuit.

16 Claims, 5 Drawing Sheets

(51) Int. Cl.
  *H05B 6/64* (2006.01)
  *H02J 7/00* (2006.01)
  *H02J 17/00* (2006.01)

(58) Field of Classification Search
  USPC ...... 219/710, 711, 712, 713, 714, 702, 715,
       219/716, 756, 762, 620, 621, 622, 627,
       219/635, 660, 667, 432, 433, 434, 435,
       219/436, 386; 99/DIG. 14, 451; 374/149
  See application file for complete search history.

(56) References Cited

U.S. PATENT DOCUMENTS

| | | |
|---|---|---|
| 4,801,782 A | 1/1989 | Ineson |
| 4,949,702 A | 8/1990 | Suzuki et al. |
| 4,967,061 A | 10/1990 | Weber, Jr. et al. |
| 4,980,539 A | 12/1990 | Walton |
| 5,300,875 A | 4/1994 | Tuttle |
| 5,811,766 A | 9/1998 | Fabrikant et al. |
| 5,994,871 A | 11/1999 | Stove |
| 6,108,489 A | 8/2000 | Frohlich et al. |
| 6,469,282 B1 | 10/2002 | Roberts |
| 7,176,426 B2 | 2/2007 | Ramirez |
| 7,710,270 B2 | 5/2010 | Shionoiri et al. |
| 7,714,535 B2 | 5/2010 | Yamazaki et al. |
| 7,764,046 B2 | 7/2010 | Osada |
| 7,773,436 B2 | 8/2010 | Inoue et al. |
| 7,830,113 B2 | 11/2010 | Sato et al. |
| 2005/0012627 A1 | 1/2005 | Lion et al. |
| 2005/0162131 A1 | 7/2005 | Sennami et al. |
| 2005/0254183 A1 | 11/2005 | Ishida et al. |
| 2006/0110863 A1 | 5/2006 | Yamamoto et al. |
| 2006/0127593 A1 | 6/2006 | Shinya et al. |
| 2006/0238312 A1 | 10/2006 | Ishii |
| 2007/0229228 A1 | 10/2007 | Yamazaki et al. |
| 2007/0229279 A1 | 10/2007 | Yamazaki et al. |
| 2007/0278998 A1 | 12/2007 | Koyama |
| 2007/0285246 A1 | 12/2007 | Koyama |
| 2008/0055047 A1 | 3/2008 | Osada et al. |
| 2008/0055279 A1 | 3/2008 | Osada et al. |
| 2008/0058029 A1 | 3/2008 | Sato et al. |
| 2008/0060422 A1 | 3/2008 | Hosoya |
| 2008/0062066 A1 | 3/2008 | Arai |
| 2008/0079396 A1 | 4/2008 | Yamazaki et al. |
| 2008/0079565 A1 | 4/2008 | Koyama |
| 2008/0122297 A1 | 5/2008 | Arai |
| 2008/0136604 A1 | 6/2008 | Kozuma et al. |
| 2008/0157606 A1 | 7/2008 | Fukutome |
| 2008/0158217 A1 | 7/2008 | Hata et al. |
| 2008/0174266 A1 | 7/2008 | Tamura |
| 2008/0210762 A1 | 9/2008 | Osada et al. |
| 2008/0211800 A1 | 9/2008 | Arasawa et al. |
| 2008/0214132 A1 | 9/2008 | Kurokawa |
| 2009/0057416 A1 | 3/2009 | Kato |
| 2014/0149064 A1* | 5/2014 | Davidson ............... G06F 15/00 702/130 |

FOREIGN PATENT DOCUMENTS

| | | |
|---|---|---|
| JP | 10-127981 A | 5/1998 |
| JP | 10-178293 A | 6/1998 |
| JP | 11-148652 A | 6/1999 |
| JP | 2001-235157 A | 8/2001 |
| JP | 2003-158394 A | 5/2003 |
| JP | 2003-299255 A | 10/2003 |
| JP | 2004-138331 A | 5/2004 |
| JP | 2005-242629 A | 9/2005 |
| JP | 2006-166522 A | 6/2006 |
| JP | 2007-312932 A | 12/2007 |

* cited by examiner

TEMPERATURE CONTROL DEVICE

BACKGROUND OF THE INVENTION

1. Field of the Invention

The present invention relates to a temperature control device which can control temperature wirelessly.

2. Description of the Related Art

In recent years, an electric power transmission technique and an individual identification technique utilizing wireless communication using radio waves, electromagnetic waves, or the like has attracted attention. An individual identification technique has been used for a wireless tag referred to as an RFID tag, an IC tag, an IC chip, an RF tag, an electronic tag, or the like. An electric power transmission technique has been used for charging some home electronic appliances. For example, products such as an electric toothbrush and an electric shaver have been put on the market.

In addition, a technique in which wireless communication and a high-frequency heating apparatus provided with a high-frequency device, such as a microwave, are combined has been considered. A high-frequency heating apparatus has been widespread in homes and it heats food using high frequency radio waves. This technique is as follows: information on food is read by wireless communication in a high-frequency heating apparatus and the high-frequency heating apparatus is controlled based on the read information.

In Patent Document 1 (Japanese Published Patent Application No. 2006-166522), a method is proposed in which radio waves generated from a high-frequency heating apparatus is converted into electric power and current is supplied to electric components. In Patent Document 2 (Japanese Published Patent Application No. 2004-138331) and Patent Document 3 (Japanese Published Patent Application No. 2005-242629), a method is proposed in which a temperature sensor is mounted on a container of food or food itself and temperature information is wirelessly exchanged with a high-frequency heating apparatus, so that the temperature of the food is controlled by the high-frequency heating apparatus.

SUMMARY OF THE INVENTION

According to the conventional technique described in Patent Document 2 and Patent Document 3, the use of a wireless tag makes it possible to control the temperature of an object to be processed in dielectric heating. However, the object to be processed is spontaneously cooled down after the dielectric heating. Thus, in a case of heating food as an object to be processed, there has been a problem in that people have had no choice but to store the food on a plate in a heat-retaining apparatus in order to keep the temperature suitable for enjoying flavor or taste even after the heating, and they have suffered from inconvenience.

In view of the foregoing problem, it is an object of the present invention to provide a temperature control device which can control the temperature of an object to be processed even after supply of radio waves or electromagnetic waves from a high-frequency heating apparatus is stopped, as well as control the temperature of the object to be processed by a wireless tag with the use of the high-frequency heating apparatus.

A temperature control device of the present invention detects the temperature of an object to be processed with a temperature sensor when the object to be processed is heated with the use of dielectric heating by radio waves or electromagnetic waves from a high-frequency heating apparatus. Then, the temperature control device returns the detected temperature information to the high-frequency heating apparatus wirelessly. The high-frequency heating apparatus can control output of radio waves or electromagnetic waves therefrom based on the obtained temperature information so that the temperature of the object to be processed stays within a predetermined range.

Furthermore, the temperature control device of the present invention includes a rechargeable battery and a heater to which electric power is supplied from the rechargeable battery. The temperature control device of the present invention converts radio waves or electromagnetic waves generated from a high-frequency heating apparatus when an object to be processed is heated into electric energy, and charges the rechargeable battery using the electric energy. Accordingly, electric power can be supplied from the rechargeable battery to the heater even after supply of electric power by radio waves or electromagnetic waves from the high-frequency heating apparatus is stopped.

Specifically, the temperature control device of the present invention includes a power supply circuit for generating electric energy from radio waves, a rechargeable battery which is charged using the electric energy, a heater which receives supply of electric power from the rechargeable battery, and a temperature sensor for detecting the temperature of an object to be processed.

In addition, the temperature control device of the present invention may detect not only the temperature of the object to be processed but also the temperature of the heater.

The temperature control device of the present invention can charge a rechargeable battery wirelessly and has a function of managing or controlling the temperature of an object to be processed using electric power of the rechargeable battery even after supply of radio waves or electromagnetic waves from a high-frequency heating apparatus is stopped.

DETAILED DESCRIPTION OF THE INVENTION

Embodiment Mode

Embodiment Modes of the present invention will be hereinafter described in detail with reference to the accompanying drawings. However, the present invention can be carried out in many different modes and it is easily understood by those skilled in the art that modes and details of the present invention can be modified in various ways without departing from the purpose and scope of the present invention. Therefore, the present invention should not be interpreted as being limited to the following description of Embodiment Modes.

Embodiment Mode 1

A structure of a temperature control device of the present invention will be described with reference to a block diagram of FIG. 1.

Figure 1:
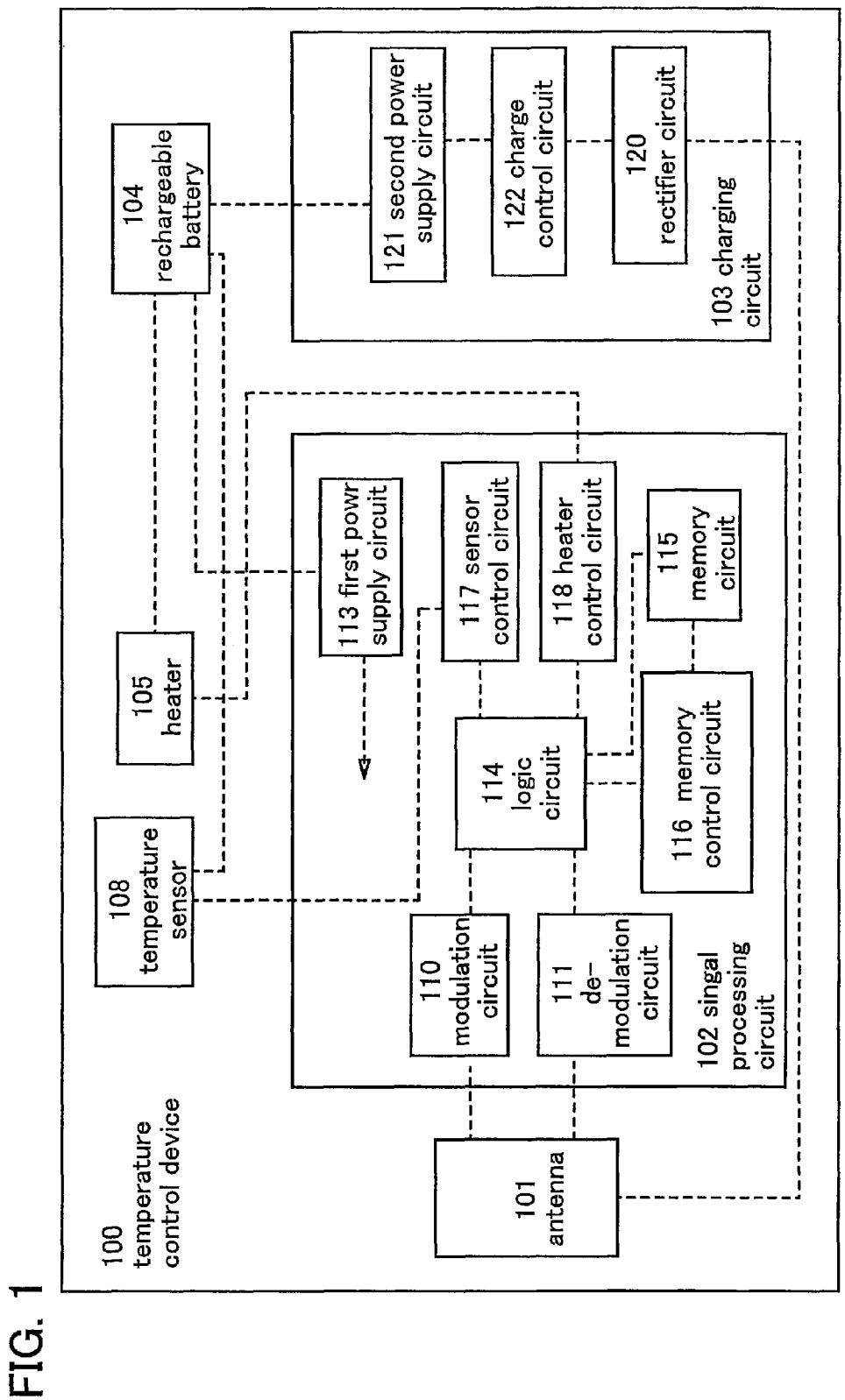
FIG. 1 is a block diagram showing a structure of a temperature control device of the present invention.

A temperature control device 100 shown in FIG. 1 includes an antenna 101, a signal processing circuit 102, a charging circuit 103, a rechargeable battery 104, a temperature sensor 108, and a heater 105. The signal processing circuit 102 includes a modulation circuit 110, a demodulation circuit 111, a first power supply circuit 113, a logic circuit 114, a memory circuit 115, a memory control circuit 116, a sensor control circuit 117, and a heater control circuit 118. The charging circuit 103 includes a rectifier circuit 120, a second power supply circuit 121, and a charge control circuit 122.

Note that the temperature control device of the present invention is acceptable as long as it can operate using AC voltage generated in the antenna 101, and the temperature control device of the present invention does not necessarily include the antenna 101.

In the temperature control device 100 described in this embodiment mode, electric energy generated by reception of radio waves by the antenna 101 is supplied to the charging circuit 103. The charging circuit 103 charges the rechargeable battery 104 using the electric energy. According to need, electric power is supplied from the rechargeable battery 104 to the temperature sensor 108, the heater 105, and the signal processing circuit 102. In addition, the temperature control device 100 can perform wireless communication with an external communication device using the signal processing circuit 102, as well as charge the rechargeable battery 104.

Note that external radio waves are used as radio waves received by the antenna 101 in order to charge the rechargeable battery 104. As the external radio waves, for example, there are radio waves at frequencies of 20 to 30 kHz in a case of a cooking heater, radio waves at a frequency of 2.45 GHz in a case of a high-frequency heating apparatus, and the like. The temperature control device 100 is provided with the antenna 101 applied to a frequency band which is to be used, so that the temperature control device 100 can receive radio waves and supply electric power.

In addition, there is no particular limitation on the shape of the antenna 101. For example, the antenna 101 can be formed into a linear shape (e.g., a dipole antenna), a flat shape (e.g., a patch antenna), or the like. In a case where radio waves are received from a high-frequency heating apparatus, the antenna 101 may have a length corresponding to a wavelength of a frequency of 2.45 GHz. In a case where the frequency is 2.45 GHz, the length may be set to about 60 mm (½ wavelength) if a half-wave dipole antenna is provided, or the length may be set to about 30 mm (¼ wavelength) if a monopole antenna is provided.

The rectifier circuit 120 shown in FIG. 1 is acceptable as long as it is a circuit which converts radio waves received by the antenna 101 into DC voltage. For example, a half-wave rectifier circuit, a full-wave rectifier circuit, a half-wave voltage doubler rectifier circuit, or the like is used. The charge control circuit 122 controls overcharge of the rechargeable battery 104. The second power supply circuit 121 controls voltage for charging the rechargeable battery 104, and the voltage is adjusted to the rated voltage or the like of the rechargeable battery 104.

Note that, in this specification, a "rechargeable battery" means a battery whose continuous operating time can be restored by charging. When a lithium battery, preferably a lithium polymer battery using a gel-like electrolyte, a lithium ion battery, or the like is used, for example, reduction in size of the rechargeable battery is possible. Needless to say, the rechargeable battery is not limited thereto as long as it is chargeable, and a battery which is chargeable and dischargeable, such as a nickel metal hydride battery or a nickel cadmium battery may be used. Alternatively, a high-capacity capacitor such as an electric double layer capacitor, or the like can be used.

The temperature sensor 108 shown in FIG. 1 measures the temperature of an object to be processed. As a typical example of the temperature sensor 108, there are a resistance temperature detector, a thermistor, and a thermocouple. Electric power is supplied to the temperature sensor 108 from the rechargeable battery 104. Temperature information measured by the temperature sensor 108 is transmitted to the sensor control circuit 117 and compared, in the logic circuit 114, with temperature information (specified temperature information) which is a standard. Data stored in the memory circuit 115 in advance or data written to the memory circuit 115 by an external signal is used for the specified temperature information. Then, the temperature control device 100 performs wireless communication with an external communication device, using a comparison result that the temperature measured by the temperature sensor 108 is higher than the standard temperature or that the temperature does not reach the standard temperature. Alternatively, the temperature information itself may be transmitted to an external communication device and compared with the standard temperature by the external communication device.

A device which generates heat by electric power is used for the heater 105 shown in FIG. 1. Electric power is supplied to the heater 105 from the rechargeable battery 104. There is no particular limitation on the shape or the kind of the heater 105. As a typical kind of heater, there is a heating wire or a sheathed heater. The heater 105 which is adjusted to the capacity of the rechargeable battery 104 or the size of the temperature control device 100 is mounted on the temperature control device 100, so that the temperature control device 100 has a heat generation function. The heater control circuit 118 controls generation of heat of the heater 105 based on temperature information. The temperature of the object to be processed is measured by the temperature sensor 108, and the measured temperature is compared with the specified temperature information by the logic circuit 114. Data stored in the memory circuit 115 in advance or data written to the memory circuit 115 by an external signal is used for the specified temperature information. The heater control circuit 118 controls generation of heat of the heater 105 based on information that the temperature of the object to be processed measured by the temperature sensor 108 is higher than the specified temperature or that the temperature does not reach the specified temperature. Note that the temperature sensor 108 may detect not only the temperature of the object to be processed but also the temperature of the heater 105, and the heater control circuit 118 may control generation of heat of the heater 105 when the temperature of the heater 105 detected by the temperature sensor 108 exceeds a certain temperature.

Figure 2:
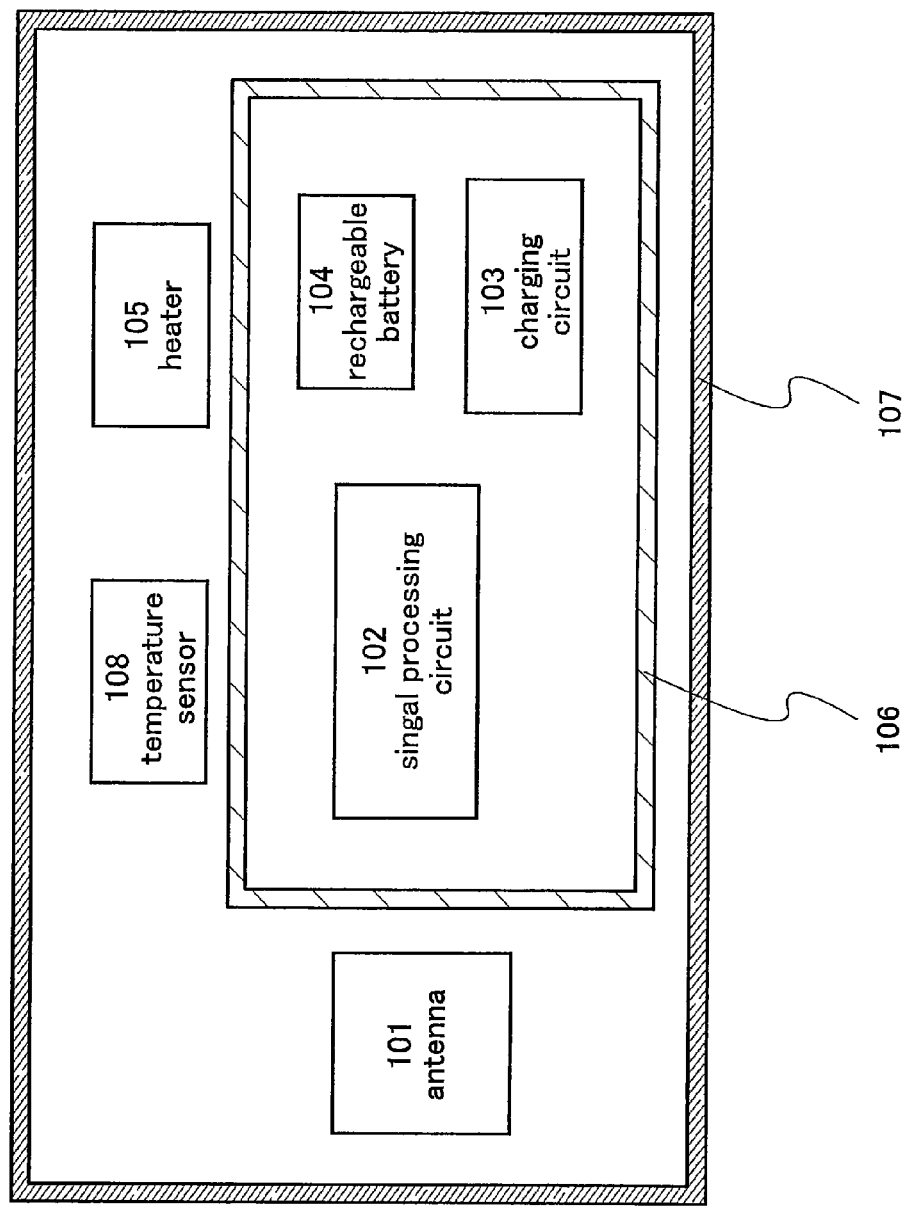
FIG. 2 is a diagram showing a positional relationship between a first protective material and a second protective material in a temperature control device of the present invention.

Note that the temperature control device 100 shown in FIG. 1 is covered with a first protective material 106 and a second protective material 107. FIG. 2 shows a positional relationship between the first protective material 106, the second protective material 107, and the antenna 101, the signal processing circuit 102, the charging circuit 103, the rechargeable battery 104, the heater 105, and the temperature sensor 108 which are included in the temperature control device 100 shown in FIG. 1.

Since the purpose of the first protective material 106 is to protect the circuits inside the temperature control device 100, specifically, the signal processing circuit 102, the charging circuit 103, and the rechargeable battery 104, from external radio waves, the first protective material 106 is formed using a material through which radio waves are not easily transmitted, such as a radio wave absorption material. For example, a material formed in such a manner that a magnetic loss material is mixed into a base material can be used as a radio wave absorption material. In this case, a synthetic rubber or urethane may be used for a base material, and a carbon material, a ferrite material, or a carbonyl iron material may be used for a magnetic loss material. A material adjusted to a frequency band used by the temperature control device 100 may be used as the first protective material 106. If the temperature control device 100 is used at a frequency of 2.45 GHz, a material in which a ferrite material is mixed into a synthetic rubber or urethane may be used as the first protective material 106, for example.

The second protective material 107 physically protects the temperature control device 100. A synthetic resin such as polyethylene, polypropylene or poly vinyl chloride, ceramic, or the like is used for the second protective material 107. Materials for the first protective material 106 and the second protective material 107 are not limited to the above-described materials. The material described as the material for the first protective material 106 may be used for the second protective material 107. The material described as the material for the second protective material 107 may be used for the first protective material 106. Alternatively, the same material can be used for the first protective material 106 and the second protective material 107. Note that it is necessary that the first protective material 106 do not easily transmit radio waves, while it is necessary that the second protective material 107 transmit radio waves. Thus, in a case where a material with high attenuation of radio wave is used for both the first protective material 106 and the second protective material 107, it is necessary that the thicknesses or the shapes of the protective materials be varied. In the case where a material with high attenuation of radio wave is used for both the first protective material 106 and the second protective material 107, the thickness of the second protective material 107 is made thinner than that of the first protective material 106 as much as possible. For example, in a case of using a ferrite material and a synthetic rubber for the first protective material 106 and the second protective material 107, the thickness of the first protective material 106 may be set to about 6 mm, and the thickness of the second protective material 107 may be set to about 1 to 2 nm. The first protective material 106 and the second protective material 107 may be formed of an appropriate material in accordance with the purpose.

Note that the temperature sensor 108 and the heater 105 may be covered with the first protective material 106, or may be covered with the second protective material 107 as well as the first protective material 106.

Next, operation of the signal processing circuit 102 is described. Radio waves received by the antenna 101 are converted into DC voltage by the rectifier circuit 120 to be stored in the rechargeable battery 104. The rechargeable battery 104 supplies electric power to the first power supply circuit 113 of the signal processing circuit 102. Then, the first power supply circuit 113 supplies voltage that has been stabilized to the modulation circuit 110, the logic circuit 114, the memory circuit 115, the memory control circuit 116, the sensor control circuit 117, and the heater control circuit 118.

A signal received by the antenna 101 is amplified or the waveform thereof is shaped by an amplifier or the like to be inputted to the logic circuit 114 as a clock signal. Moreover, a signal included in radio waves is demodulated by the demodulation circuit 111 to be inputted to the logic circuit 114 as data.

In addition, when information of the temperature control device 100 is called up, the memory control circuit 116 is controlled with the use of a signal from the logic circuit 114, and data stored in the memory circuit 115 is called up. Next, the data called up from the memory circuit 115 is processed by the logic circuit 114 and amplified by an amplifier or the like, and then, the modulation circuit 110 is operated. Although the data is processed in accordance with a method specified in a standard such as ISO 14443, ISO 15693, or ISO 18000, a standard other than the above-described standard may be used as long as consistency with an external communication device which performs communication with the temperature control device 100 can be ensured.

Embodiment Mode 2

Next, a specific structure of a temperature control device of the present invention will be described.

Figure 3A:
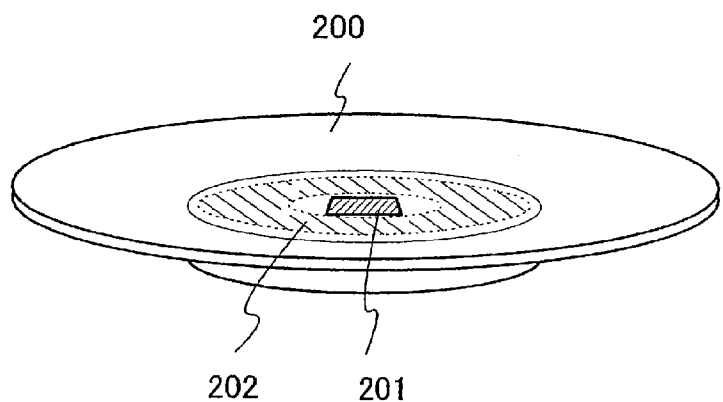
FIGS. 3A and 3B are respectively a perspective view and a top view showing a specific structure of a temperature control device of the present invention.
Figure 3B:
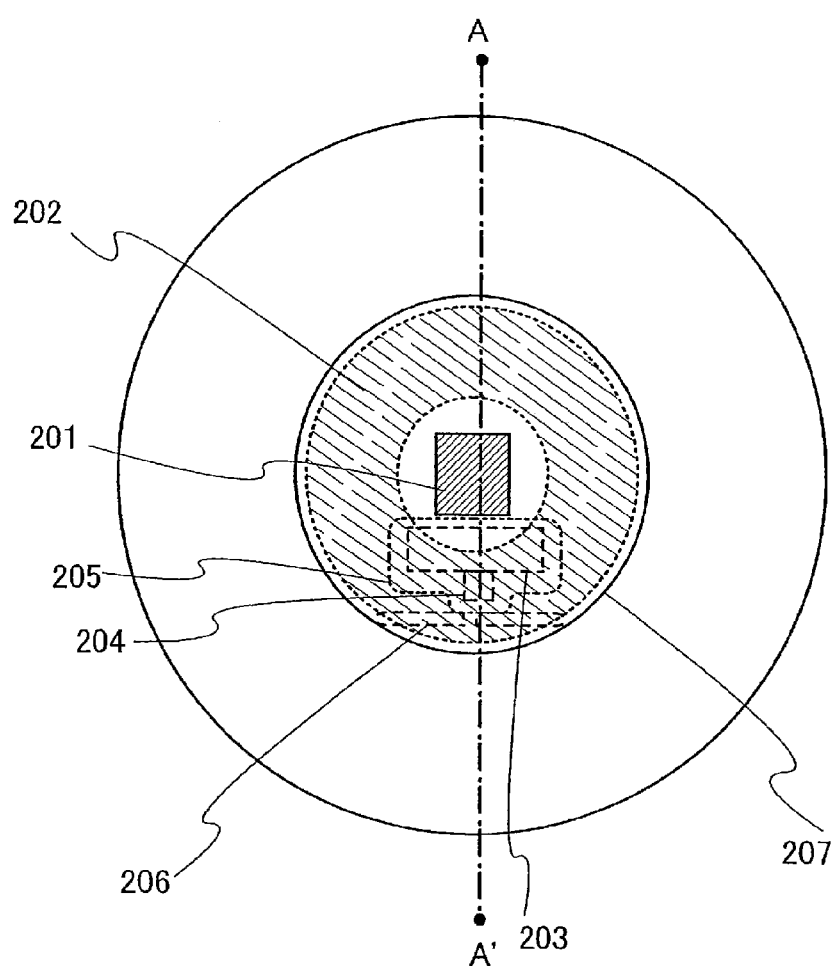

FIGS. 3A and 3B show one mode of the temperature control device of the present invention. FIG. 3A corresponds to a perspective view of a temperature control device 200 of this embodiment mode, and FIG. 3B corresponds to a top view thereof. In addition, FIG. 5 corresponds to a cross-sectional view taken along a dashed line A-A' of FIG. 3B. The temperature control device 200 shown in FIGS. 3A and 3B has a shape capable of having an object to be processed such as food thereon or containing it therein. A temperature sensor 201 is provided so as to be in contact with or adjacent to an object to be processed. In addition, the temperature control device 200 includes a heater 202. The heater 202 is provided so as to have distance with the temperature sensor 201 and also so as to be in contact with or adjacent to an object to be processed.

A rechargeable battery 203 and a signal processing circuit and charging circuit 204 are covered with a first protective material 205. In addition, the rechargeable battery 203, the signal processing circuit and charging circuit 204, the heater 202, and an antenna 206 are covered with a second protective material 207. Note that, although an example in which the temperature sensor 201 is covered with the second protective material 207 is shown in FIGS. 3A and 3B, the temperature sensor 201 may be exposed without being covered with the second protective material 207. In addition, although the heater 202 is covered with the second protective material 207 in FIGS. 3A and 3B, the heater 202 may be exposed without being covered with the second protective material 207.

Figure 5:
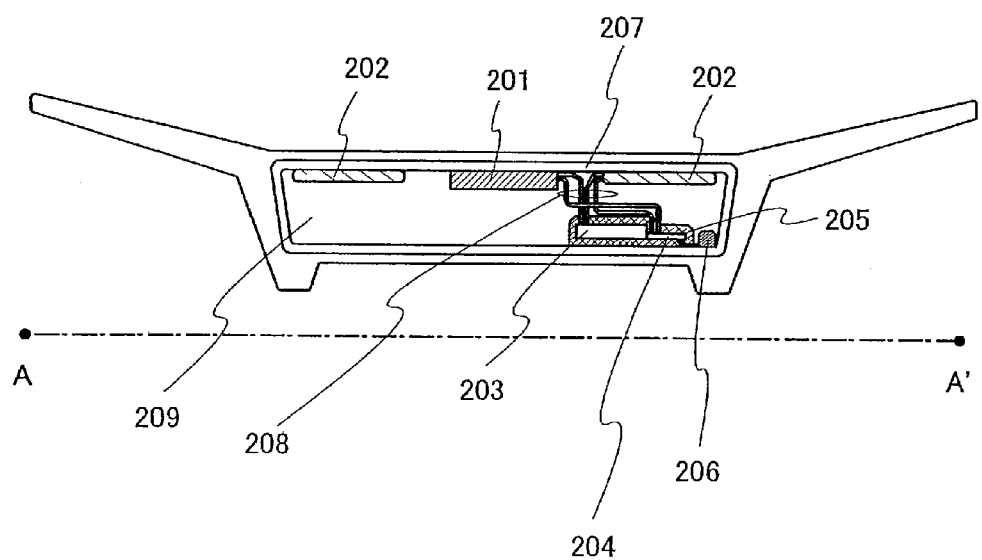
FIG. 5 is a cross-sectional view showing a specific structure of a temperature control device of the present invention.

As shown in FIG. 5, the rechargeable battery 203 and the signal processing circuit and charging circuit 204 which are covered with the first protective material 205 are connected to the temperature sensor 201 and the heater 202 through a plurality of wirings 208. In FIG. 5, a region surrounded by the second protective material 207 is filled with a filler 209 such as a resin. Although the filler 209 is not necessarily provided, in a case where a space is formed in the region surrounded by the second protective material 207, the space is filled with the filler 209, so that physical strength of the temperature control device can be increased.

Note that, although FIGS. 3A and 3B show a case where the temperature control device 200 has a shape capable of having an object to be processed such as food thereon or containing it, the present invention is not limited to this structure. For example, in a case where the temperature control device 200 is attached to an instrument for having an object to be processed thereon or containing it, the temperature control device 200 does not necessarily have the shape capable of having the object to be processed thereon or containing it. In a case where an object to be processed is food, the temperature control device 200 is mounted on a plate, a bowl, a lunchbox, a container, or the like, for example. Food may be contained in a container on which the temperature control device 200 of the present invention is mounted and heated by a high-frequency heating apparatus.

Next, a case where the temperature control device of the present invention is used in a high-frequency heating apparatus is described with reference to FIGS. 4A and 4B.

The temperature control device 200 of the present invention receives external radio waves by an antenna and charges the rechargeable battery. In a case where the antenna receives radio waves from a high-frequency heating apparatus 300, the antenna may have a length corresponding to a wavelength of a frequency of 2.45 GHz. In a case where the frequency is 2.45 GHz, the length may be set to about 60 mm (½ wavelength) if a half-wave dipole antenna is provided, or the length may be set to about 30 mm (¼ wavelength) if a monopole antenna is provided. In addition, the shape of the antenna is not limited. The antenna is acceptable as long as it corresponds to a frequency of 2.45 GHz.

Figure 4A:
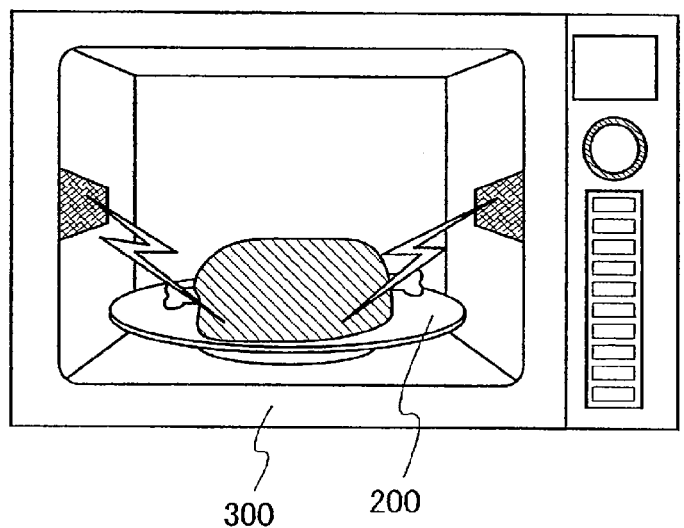
FIGS. 4A and 4B are views showing a usage pattern of a temperature control device of the present invention.

As shown in FIG. 4A, the antenna included in the temperature control device 200 receives radio waves from the high-frequency heating apparatus 300. The radio waves received by the antenna is converted into DV voltage by a rectifier circuit and stored in the rechargeable battery. Then, electric power is supplied from the rechargeable battery to the temperature sensor, the heater, and the signal processing circuit. The high-frequency heating apparatus 300 also needs to have a structure capable of wireless communication in order to perform wireless communication with the temperature control device 200. The temperature control device 200 processes temperature information in the temperature control device 200 and controls the high-frequency heating apparatus 300. Alternatively, the high-frequency heating apparatus 300 controls its operation based on the information received from the temperature control device 200. The temperature sensor supplied with electric power by the rechargeable battery measures the temperature of an object to be processed. When the temperature reaches a specified temperature or higher, generation of high frequency from the high-frequency heating apparatus 300 is stopped. The temperature control device 200 charges the rechargeable battery while the object to be processed is heated.

Figure 4B:
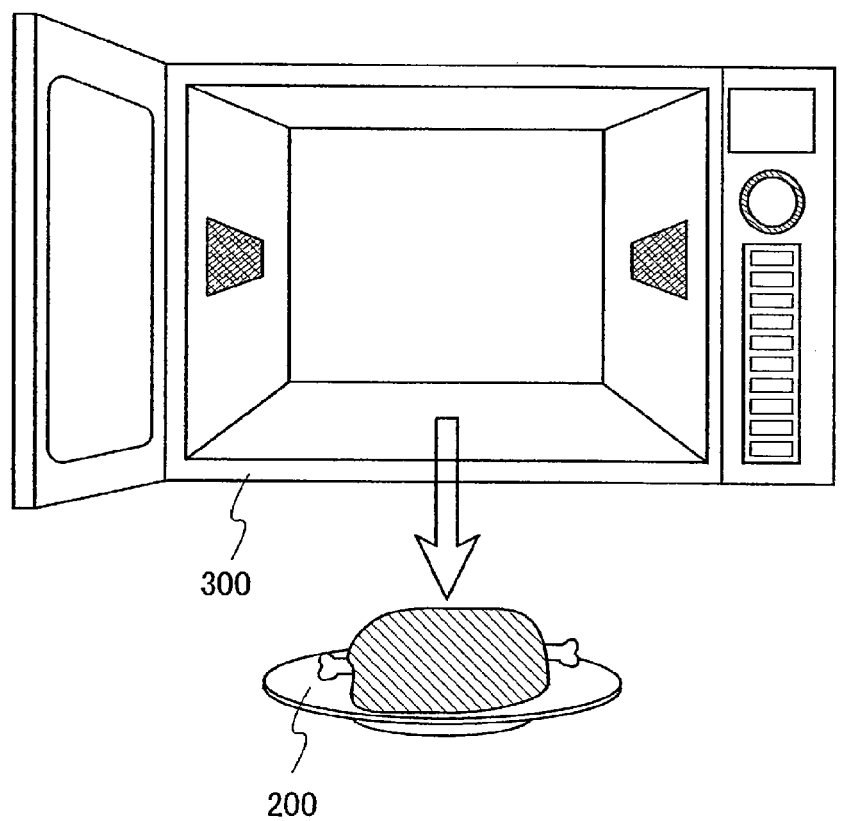

Next, as shown in FIG. 4B, after cooking with the high-frequency heating apparatus 300, the heater is operated by the charged rechargeable battery, so that the object to be processed can be kept warm. Since the temperature control device 200 is capable of wireless communication also outside the high-frequency heating apparatus 300, it can control the heater or the like wirelessly. In this case, an interrogator referred to as a reader or a reader/writer which performs wireless communication at a frequency of 2.45 GHz is needed.

As described above, the temperature control device of the present invention operates using the rechargeable battery which is charged wirelessly. The rechargeable battery is charged, so that the temperature control device can supply electric power to the temperature sensor and the heater even when it does not receive radio waves.

This application is based on Japanese Patent Application Ser. No. 2006-345555 filed with Japan Patent Office on Dec. 22, 2006, the entire contents of which are hereby incorporated by reference.

What is claimed is:

1. A temperature control device comprising:
   a temperature sensor configured to detect a temperature of an object heated by a radio wave;
   a signal processing circuit configured to compare the temperature of the object with a standard temperature;
   an antenna configured to generate electric energy by reception of the radio wave;
   a rechargeable battery charged by the electric energy;
   a charging circuit configured to control charging of the rechargeable battery;
   a heater configured to heat the object in accordance with a comparison result by the signal processing circuit;
   a first protective material covering the signal processing circuit, the rechargeable battery, and the charging circuit; and
   a second protective material covering the first protective material, the temperature sensor, the heater, and the antenna,
   wherein the second protective material transmits the radio wave more than the first protective material,
   wherein the temperature sensor is configured to detect a temperature of the heater, and
   wherein the heater is controlled by the signal processing circuit in accordance with the temperature of the heater.

2. The temperature control device according to claim 1, wherein the first protective material comprises at least one selected from the group consisting of a carbon material, a ferrite material, and a carbonyl iron material mixed into a synthetic rubber.

3. The temperature control device according to claim 1, wherein the second protective material comprises at least one selected from the group consisting of a carbon material, a ferrite material, and a carbonyl iron material mixed into an urethane.

4. The temperature control device according to claim 1, wherein the second protective material comprises one of a synthetic resin and ceramic.

5. The temperature control device according to claim 1, wherein a thickness of a first layer formed of the first protective material is thicker than a thickness of a second layer formed of the second protective material.

6. The temperature control device according to claim 1, wherein the first protective material comprises a radio wave absorption material.

7. The temperature control device according to claim 1, further comprising a filler between the first protective material and the second protective material.

8. The temperature control device according to claim 1, wherein the radio wave is generated from a high-frequency heating apparatus.

9. A temperature control device comprising:
   a temperature sensor configured to detect a temperature of an object heated by a radio wave;
   a signal processing circuit configured to compare the temperature of the object with a standard temperature;

an antenna configured to generate electric energy by reception of the radio wave;

a rechargeable battery charged by the electric energy;

a charging circuit configured to control charging of the rechargeable battery;

a heater configured to heat the object in accordance with a comparison result by the signal processing circuit;

a first protective material covering the signal processing circuit, the rechargeable battery, the charging circuit, the temperature sensor, and the heater; and a second protective material covering the first protective material and the antenna, wherein the second protective material transmits the radio wave more than the first protective material, wherein the temperature sensor is configured to detect a temperature of the heater, and wherein the heater is controlled by the signal processing circuit in accordance with the temperature of the heater.

10. The temperature control device according to claim 9, wherein the first protective material comprises at least one selected from the group consisting of a carbon material, a ferrite material, and a carbonyl iron material mixed into a synthetic rubber.

11. The temperature control device according to claim 9, wherein the second protective material comprises at least one selected from the group consisting of a carbon material, a ferrite material, and a carbonyl iron material mixed into an urethane.

12. The temperature control device according to claim 9, wherein the second protective material comprises one of a synthetic resin and ceramic.

13. The temperature control device according to claim 9, wherein a thickness of a first layer formed of the first protective material is thicker than a thickness of a second layer formed of the second protective material.

14. The temperature control device according to claim 9, wherein the first protective material comprises a radio wave absorption material.

15. The temperature control device according to claim 9, further comprising a filler between the first protective material and the second protective material.

16. The temperature control device according to claim 9, wherein the radio wave is generated from a high-frequency heating apparatus.

* * * * *